United States Patent [19]
Yamazaki

[11] Patent Number: 5,496,395
[45] Date of Patent: Mar. 5, 1996

[54] SYSTEM FOR RECOVERING ORGANIC SOLVENT IN SOIL

[75] Inventor: Akira Yamazaki, Tokyo, Japan

[73] Assignee: Kureha Kagaku Kogyo Kabushiki Kaisha, Tokyo, Japan

[21] Appl. No.: 356,124

[22] Filed: Dec. 15, 1994

[30] Foreign Application Priority Data

Dec. 28, 1993 [JP] Japan .................................. 5-349050

[51] Int. Cl.$^6$ ................................................ B01D 53/12
[52] U.S. Cl. .................. 96/123; 96/128; 96/130; 96/146; 96/150; 55/267; 55/356
[58] Field of Search ............... 95/109, 110; 96/108, 96/121–123, 126–130, 143, 144, 146, 150, 152; 55/267–269, 356

[56] References Cited

U.S. PATENT DOCUMENTS

| | | | |
|---|---|---|---|
| 2,270,903 | 1/1942 | Rudbach | 95/109 |
| 2,519,873 | 8/1950 | Berg | 96/126 X |
| 2,522,426 | 9/1950 | Black | 95/109 |
| 2,545,067 | 3/1951 | Berg et al. | 96/150 X |
| 2,583,239 | 1/1952 | Teter | 95/109 X |
| 2,590,148 | 3/1952 | Berg | 96/126 X |
| 2,673,832 | 3/1954 | Lassiat | 96/144 X |
| 2,992,895 | 7/1961 | Feustal et al. | 96/123 X |
| 4,047,906 | 9/1977 | Murakami et al. | 55/79 |
| 4,061,477 | 12/1977 | Murakami et al. | 55/79 |
| 4,147,523 | 4/1979 | Izumo | 96/126 |
| 4,207,082 | 6/1980 | Okamoto et al. | 55/60 |
| 4,259,094 | 3/1981 | Nagai et al. | 55/181 |
| 4,846,934 | 7/1989 | Carberry | 96/127 X |
| 4,869,734 | 9/1989 | Jacquish | 96/144 X |
| 4,998,848 | 3/1991 | Hansen | 96/126 X |
| 5,304,234 | 4/1994 | Takatsuka et al. | 96/123 X |

FOREIGN PATENT DOCUMENTS

| | | | |
|---|---|---|---|
| 53-8664 | 3/1978 | Japan . | |
| 58-173323 | 10/1983 | Japan | 96/127 |
| 60-179139 | 9/1985 | Japan | 96/144 |
| 4-225887 | 8/1992 | Japan . | |
| 5-76618 | 3/1993 | Japan . | |

OTHER PUBLICATIONS

"Beaded carbon solvent recovery", *Chemical Engineering*, vol. 84, No. 18, (Aug. 29, 1977), pp. 39 and 40.

*Primary Examiner*—Robert Spitzer
*Attorney, Agent, or Firm*—Oblon, Spivak, McClelland, Maier & Neustadt

[57] ABSTRACT

An organic solvent recovery system comprises a vacuum suction device for sucking a gas containing organic solvent from a soil contaminated by the organic solvent and a gas treating apparatus connected to a discharge side of the vacuum device through a connection line for adsorbing and recovering the organic solvent in the gas by activated carbon. The gas treating apparatus comprises an adsorption unit connected to the vacuum device provided with a multistage fluidized bed of the activated carbon for adsorbing the organic solvent in the gas, and a desorption unit arranged side by side with the adsorption unit and provided with a moving bed of the activated carbon for desorbing the organic solvent from the activated carbon, the desorption unit being further provided with a heating device for heating the activated carbon and a gas supply device for supplying a carrier gas for conveying a desorbed solvent gas. The circulation of the activated carbon is performed between the adsorption unit and the desorption unit through the first and second transfer units.

9 Claims, 1 Drawing Sheet

SYSTEM FOR RECOVERING ORGANIC SOLVENT IN SOIL

BACKGROUND OF THE INVENTION

1. Field of the Invention

The present invention relates to an organic solvent recovering system adapted to clean a soil contaminated by a contamination substance such as organic solvent and recover the solvent contaminant from the soil, and more particularly, a system for recovering the organic solvent in the soil having an improved ability for recovering the organic solvent, having a compact structure to be easily movable, generating less condensed liquid in a decantation process and having an improved energy demand.

2. Description of the Prior Art

For example, atmospheric environments or soil environments near industrial areas performing defatting working, metal cleaning working, etc., dry cleaning shops, chemical material storage and treatment areas, and chemical substance disposal areas are often contaminated by organic solvents such as trichloroethylene, tetrachloroethylene, dichloromethane and the like.

With respect to the soil environment, in the initial stage of the soil contamination caused by liquid substances, the contaminants generally exist at a ground surface area on a ground-water level. However, when the soil contamination has continuously progressed, the contaminants soak into a ground-water bed, providing a severe problem of the contamination of the ground water. Therefore, it has been desired to remove or recover the contaminants before the soaking of the contaminants to the ground-water bed.

Prior art provides various methods for removing or recovering such liquid contaminants in a soil, which includes a method in which the contaminated soil portion is excavated from the soil and the excavated soil portion is thereafter air-dried, a method in which the excavated soil portion is heated at about 1300° C. by means of a heating furnace or the like, and a method in which the liquid contaminants are washed out through liquid-liquid contact or gas-liquid contact by supplying water or water vapor in the soil.

However, these prior art methods involve much labor and time for, for example, digging the soil and also provide less soil cleaning efficiency or secondary contamination problem. In order to solve such problems, the prior art further provides various cleaning systems or apparatus such as disclosed in the Japanese Patent Laid-open Publication Nos. HEI 4-225887 and HEI 5-76618.

In the prior art technologies such as disclosed in the Japanese Patent Laid-open Publication No. HEI 4-225887, proposed is to use an adsorption apparatus or a gas treating apparatus provided with an activated carbon for adsorbing and removing the volatile contaminants sucked from the contaminated soil by a vacuum pump. However, in such apparatus, the activated carbon adsorbing the volatile contaminants is not regenerated, and it is required to additionally prepare an activated carbon treating or regenerating apparatus because the activated carbon fully adsorbing the volatile contaminants, then constitutes a new contaminated material, unless treated. Still furthermore, in such apparatus, it is obliged to frequently change the activated carbon with a new one, thus being inconvenient.

Furthermore, in the Japanese Patent Laid-open Publication No. HEI 5-76618, proposed is to use a gas cleaning apparatus provided with a fixed-bed type solvent recovery unit having an activated carbon fiber adsorbent for adsorbing the solvent vapor sucked from the contaminated soil and a steam supply unit for regenerating, i.e. desorbing, the activated carbon fiber adsorbent. However, in such apparatus, a large quantity of regenerating steam must be utilized and a large quantity of condensed water dissolving the organic solvent is generated in the subsequent solvent separation process, namely the decantation process. Thus, such condensed water cannot be discharged as it is and a new waste water treating process or means for removing the organic solvent dissolving in the condensed water is additionally required. In such process, however, the organic solvent thus removed from the condensed water will have to be exhausted into atmosphere in many cases, which constitutes a secondary contamination problem. Furthermore, a cooling means is also required for condensing a large amount of steam, which involves a large coolant requirement.

Still furthermore, in the Japanese Patent Laid-open Publication No. SHO 52-14580, and in the U.S. Pat. Nos. 4,259,094, 4,207,082, 4,061,477 and 4,047,906, there is proposed a gas treating apparatus provided with a multistage fluidized bed type adsorption unit for cleaning a harmful substance in the atmosphere through the contact with spherical activated carbon particles and a heat desorption unit for desorbing the harmful substance from the activated carbon adsorbing the harmful substance and for regenerating the activated carbon. However, since such apparatus generally has a vertically elongated structure in which the respective units or equipments are integrally arranged in series, it is difficult to move the apparatus itself and hence difficult to utilize the apparatus in different operating sites.

SUMMARY OF THE INVENTION

An object of the present invention is to substantially eliminate defects or problems encountered in the prior art described above and to provide a system for recovering organic solvent contaminant in soil having an improved organic solvent adsorption and removing performance, having a movable compact structure, less generating condensed water in the solvent separation process and also having a good heat efficiency in operations.

This and other objects can be achieved according to the present invention by providing a system for recovering an organic solvent contaminant in a soil, comprising:

a vacuum sucking means for sucking a gas containing the organic solvent contaminant from the soil contaminated by the organic solvent, comprising a solvent collecting tube inserted into the soil and a vacuum device connected to the solvent collecting tube for vacuum sucking the gas containing the organic solvent from the soil; and a gas treating apparatus connected to a discharge side of the vacuum device through a connection line for adsorbing and recovering the organic solvent in the gas, the gas treating apparatus comprising:

an adsorption unit connected to the vacuum device and provided with a multistage fluidized bed of the activated carbon for adsorbing the organic solvent in the gas to be treated;

a desorption unit arranged side by side with the adsorption unit and provided with a moving bed of the activated carbon for desorbing the organic solvent from the activated carbon, the desorption unit being further provided with a heating means for heating the activated carbon of the moving bed and a gas supply means for supplying a carrier gas such as air, nitrogen gas or carbonic acid gas, for carrying away a desorbed solvent gas out of the moving bed;

a first transfer unit having one end connected to a bottom portion of the adsorption unit and another end connected to an upper portion of the desorption unit for transferring the activated carbon from the adsorption unit to the desorption unit; and a second transfer unit having one end connected to a bottom portion of the desorption unit and another end connected to an upper portion of the adsorption unit for transferring the activated carbon from the desorption unit to the adsorption unit, wherein the activated carbon is circulated between the adsorption unit and the desorption unit through the first and second transfer units.

In preferred embodiments, the first and second transfer units are pneumatic conveyer units.

The multistage fluidized bed comprises a plurality of perforated trays arranged in nearly parallel to each other so as to form the multistage fluidized bed of the activated carbon and each tray provided with a number of perforations.

The organic solvent recovering system further comprises a condenser and a separator connected to a desorbed solvent gas discharge port of the desorption unit for separating and/or recovering the organic solvent from the desorbed solvent gas.

The separator is operatively connected from the upper portion thereof to the connection line connecting the vacuum device and the gas treating apparatus.

The organic solvent is a halogen group organic solvent or a mixture containing the halogen group organic solvent.

The adsorption unit and the desorption unit each has a structure capable of being moved on a vehicle.

According to the structure of the organic solvent recovering system of the present invention described above, the air containing organic solvent sucked from the contaminated soil is transferred into the gas treating apparatus through the vacuum sucking device. In the adsorption unit of the gas treating apparatus, the organic solvent contained in the air is adsorbed by the activated carbon particles forming the multistage fluidized bed, and the activated carbon particles is then transferred into the desorption unit of the gas treating apparatus through a first transfer unit. In the desorption unit, the organic solvent is desorbed from the activated carbon particles and carried away outside the desorption unit by means of the carrier gas such as non-condensible gas so as to be further subjected to the separating operation, and the activated carbon particles containing reduced amount of the organic solvent are returned to the adsorption unit through the second transfer unit and are reused.

As described above the treating apparatus comprises compact adsorption and desorption units each capable of easily being moved on a vehicle. The use of the non-condensible gas makes reduce the generation of the condensed water in solvent recovery process.

The nature and further features of the present invention will be made more clear from the following descriptions made in conjunction with the accompanying drawing.

BRIEF DESCRIPTION OF THE DRAWING

The single drawing of FIG. 1 is a schematic general view of a system for recovering an organic solvent in a soil according to the present invention.

DESCRIPTION OF THE PREFERRED EMBODIMENT

Figure 1:
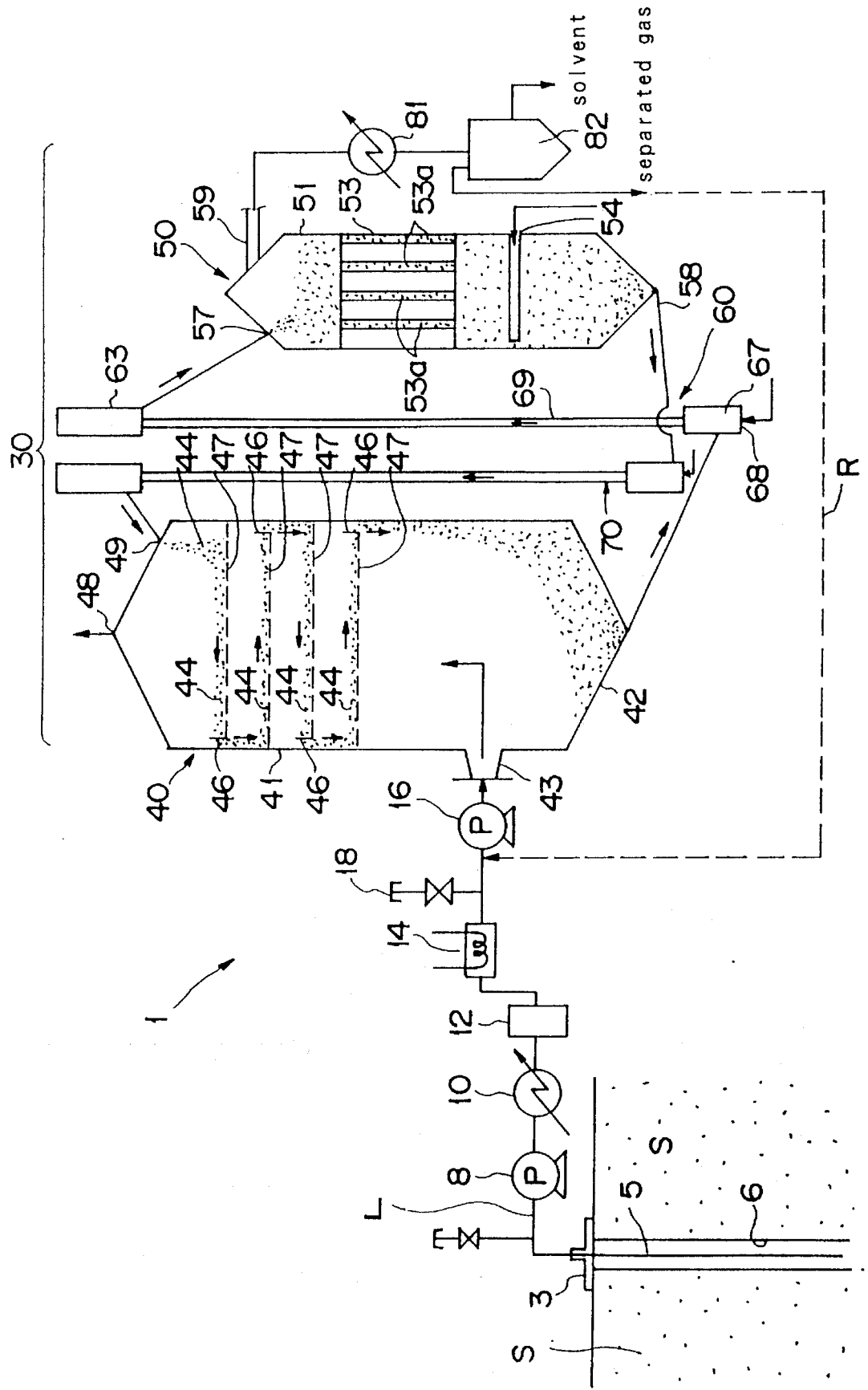

One preferred embodiment of an organic solvent recovery system according to the present invention will be described hereinafter with reference to FIG. 1 in a case particular for recovering the organic solvent soaked into the soil.

Referring to FIG. 1, the system 1 for recovering the organic solvent in the soil, called hereinafter merely the recovering system 1, is provided with a solvent collecting tube 5 inserted in the soil S contaminated by the organic solvent, a vacuum suction device 8 connected at the suction side thereof to the solvent collecting tube 5 for vacuum sucking the organic solvent from the contaminated soil, and a gas treating apparatus 30 connected to the vacuum suction device 8 at the discharge side thereof for adsorbing and recovering the organic solvent.

The gas treating apparatus 30 includes an adsorption unit 40 provided with a multistage fluidized bed of spherical activated carbon for adsorbing the organic solvent in the gas to be treated and a desorption unit 50 provided with a moving bed of the spherical activated carbon for desorbing the organic solvent adsorbed in the spherical activated carbon in the adsorption unit 40. The adsorption unit 40 and the desorption unit 50 are arranged side by side and both the units 40 and 50 are connected through a first activated carbon transfer unit 60 (called hereinafter a first transfer unit 60) connecting a lower end portion of the adsorption unit 40 and an upper end portion of the desorption unit 50. The adsorption unit 40 and the desorption unit 50 are also connected through a second activated carbon transfer unit 70 (called hereinafter a second transfer unit 70) connecting a lower end portion of the desorption unit 50 and an upper end portion of the adsorption unit 40. According to such an arrangement, the spherical activated carbon circulates between the units 40 and 50 through the first and second transfer units 60 and 70.

The solvent collecting tube 5 is disposed along the central axis of a vertical bore 6 excavated in a perpendicular direction into the contaminated soil S. The depth of the excavated bore 6 may have a vertical length of several tens meter in a certain case, which will depend on the extent of the soil contamination, and the depth of the ground-water. An upper end portion of the vertical bore 6, i.e. ground surface portion, is sealed with a seal flange 3 provided with the solvent collecting tube 5. The solvent collecting tube 5 is connected to a vacuum pump P as the vacuum suction device 8 through a connection line L passing substantially the central portion of the seal flange 3. According to this connection, when the vacuum pump P is operated, the organic solvent in the soil S can be sucked through the solvent collecting tube 5. The solvent collecting tube 5 is provided with a number of small holes on the side wall thereof for easy collecting of the organic solvent in the soil S. Further, in usual, it is desired that a pressure in the vertical bore 6 is maintained to be of an absolute value of about 10 to 100mmHg at the sucking operation time of the vacuum pump P.

In a preferred embodiment, in order to improve the organic solvent recovering speed, a heating means for heating the contaminated soil S such as a warm air supplying pipe or an air blowing means directed to the solvent collecting tube 5 in the contaminated soil S may be disposed.

The solvent collecting tube 5 is connected to the adsorption unit 40 through the connection line L to which the vacuum pump P is incorporated, and furthermore, to this connection line L, are also incorporated a condenser 10, a drain separator 12, heating means 14 and a blower 16 in series so that the blower 16 is located near an inlet port 43 of a tank body 41. That is, the condenser 10 serves to condense the water vapor component sucked from the contaminated soil S together with the organic solvent, the drain separator 12 serves to separate and remove the condensed water vapor, and the heating means 14 such as an electric heater serves to heat a gas sucked from the soil S by the vacuum pump P to a temperature of 20°–40° C., for example, to thereby lower a relative humidity of the gas containing the organic solvent, thus improving the adsorption efficiency of the adsorption unit 40 and suppressing or preventing the spherical activated carbon in the fluidized bed from growing sticky.

The thus processed gas to be treated is then supplied, by means of the blower 16, to the gas treating apparatus 30 equipped with the adsorption unit 40 and the desorption unit 50.

The adsorption unit 40 is provided with a multi-staged fluidized bed in which a thin layer of the spherical activated carbon (a height of 20–60mm, for example) is formed in each stage, so as to adsorb and capture efficiently the organic solvent in the crude gas supplied by the blower 16. More in detail, the adsorption unit 40 comprises the cylindrical tower-shaped tank body 41 provided, at the lower side wall thereof, with the inlet port 43 through which the crude gas to be treated is guided into the tank body 41 and also provided, at the top end portion thereof, with an outlet port 48 through which the gas after treated is discharged.

Inside the tank body 41, there are disposed a plurality of perforated trays 47, each in shape of plate, having a multi-stage structure. In the illustration of FIG. 1, four stages are showed for example. The spherical activated carbon particles 44 are disposed on the perforated trays 47 to form a horizontally moving fluidized bed. In actual operation, the spherical activated carbon particles 44 forming the fluidized bed continuously contact with the crude gas during horizontal moving thereof in each tray 47, and the activated carbon particles 44 fall down as shown by arrows from the upper stage tray to the subsequent lower stage tray through downcomers 46 formed to peripheral sides of the perforated trays 44 near the inner wall of the tank body 41. During such continuous horizontal moving and falling-down of the activated carbon particles 44, they adsorb the vapor of organic solvent. The horizontal moving of the activated carbon particles 44 on the perforated trays 47 will be done by arranging one downcomer 46 to one side in an upper stage tray and next one downcomer 46 to another opposing side in an adjacent lower stage tray as shown in FIG. 1.

In a preferred example, each perforation formed to the perforated tray 47 may have a diameter of 3–5mm, and a number of perforations may satisfy, for example, a ratio of opening (total area of perforations/total area of each tray) being within 5–25%. A stable fluidized bed formed with the spherical activated carbon particles 44 is brought by setting the ratio of opening of the perforated tray 47 and the linear velocity of the crude gas in the adsorption unit 40 to predetermined preferable values, thus making stable the movement of the activated carbon particles and, hence, performing the effective and continuous adsorption reaction according to the recovering system 1 of the present invention.

On the contrary, in a case where the linear velocity of the gas flow is lowered from the predetermined value, a fluidizing state will be made worse and the horizontal moving of the activated carbon particles will be impeded. In general, an apparatus provided with a fluidized bed has a defect in change of flow quantity of a gas to be treated. According to the present invention, in order to eliminate such defect, a damper 18 is provided on a suction side of the blower 16 between the blower 16 and the heating means 14. This damper 18 serves to adjust the flow quantity of the gas to be introduced into the adsorption unit 40 by introducing an external air. This flow adjusting also serves to dilute the gas of high solvent concentration discharged from the vacuum pump P at the initial operation stage of the recovering system 1 to a solvent concentration suitable for the adsorption of the activated carbon.

It is desired in the preferred embodiment of the present invention that the average diameter of the spherical activated carbon particles is about 400–1200μm, the particle density is about $2.0g/cm^3$ and the bulk density thereof is about $0.5–0.7g/cm^3$.

The spherical activated carbon particles 44 passing the lowermost perforated tray 47 are once stored in a bottom portion 42, having conical shape, of the tank body 41, and then continuously are fed through the first transfer unit 60 to the desorption unit 50 disposed side by side with the adsorption unit 40.

As stated before, the bottom portion 42 of the adsorption unit 40 is connected to the upper portion of the desorption unit 50 in which the spherical activated carbon particles 44 are regenerated, through the first transfer unit 60. In the present embodiment, the first transfer unit 60 is a pneumatic conveyer means of the present invention which is provided with an air conveyer 67 disposed to a lower portion, a transfer tube 69 connected to the air conveyer 67 so as to lift the spherical activated carbon particles 44 due to air flow and an air speed reducer 63 disposed to an upper portion of the transfer tube 69, as shown in FIG. 1. An air nozzle 68 is provided for the bottom portion of the air conveyer 67, and a highly pressurized air is injected from the air nozzle 68 into the transfer tube 69 through the air conveyer 67 to thereby convey the spherical activated carbon particles stored in the bottom portion 42 of the adsorption unit 40 to the upper portion of the desorption unit 50 through an inlet port 57.

Next, in the desorption unit 50, to which the adsorbed spherical activated carbon particles 44 are air transferred as described above, the desorption of the adsorbed organic solvent, i.e. regeneration of the adsorbed activated carbon forming a moving bed, are performed during the movement, i.e. fall-down due to the self-gravity of the activated carbon particles in a tank body 51. The desorption unit 50 comprises the cylindrical tower-shaped tank body 51, a heating device 53 disposed inside the tank body 51, a carrier gas supply device 54 disposed in the tank body 51 below the heating device 53 and supplying a carrier gas for carrying away the desorbed solvent gas outside of the tank body 51, an outlet 59 provided at the upper portion of the tank body 51 for discharging the desorbed solvent gas, and a discharge outlet 58 provided at the lower portion of the tank body 51.

The heating device 53 is provided with a plurality of vertical cylindrical paths, i.e. pipes, 53a which extend axially in the tank body 51 and through which the spherical activated carbon particles 44 are moved downward due to their self-gravity, and during the movement therein, the spherical activated carbon particles are heated indirectly from the outer side of the paths 53a, by means of heating medium such as steam, heating medium oil, combustion gas, hot air, or other heating means, thereby performing the desorption of the adsorbed substance from the activated carbon.

The carrier gas supply device 54 supplies a non-condensible gas as carrier gas for carrying away the solvent gas desorbed and separated from the activated carbon particles outside of the tank body 51, and the carrier gas thus supplied then contacts with the activated carbon particles 44 forming moving bed, in a manner of counter flow. The desorbed component, i.e. organic solvent, is discharged externally together with the non-condensible gas through the outlet 59. In these processes, the heating temperature for the activated carbon and the carrier gas quantity will be optimally decided in accordance with the kind and the amount of the organic solvent to be desorbed.

The spherical activated carbon particles after the regeneration is thereafter circulated from the desorption unit 50 to the adsorption unit 40 through the second transfer conveying unit 70 connecting the conical bottom portion of the desorption unit 50 and the upper portion of the adsorption unit 40 through inlet port 49. The second transfer unit 70 has substantially the same structure as that of the first transfer unit 60, so that the details thereof are now omitted herein.

As described above, the spherical activated carbon particles repeatedly adsorb and desorb the organic solvent vapor, during the circulation thereof between the adsorption unit 40 and the desorption unit 50 through the first and second transfer units 60 and 70.

Although, as an alternative, mechanical means such as belt conveyers or bucket conveyers may be utilized as the transfer units 60 and 70, pneumatic conveyer means such as the pneumatic conveyer unit according to the present invention will be preferably utilized in consideration of the superior abrasion-proof property of the spherical activated carbon particles and the particle behavior thereof.

The gas discharged from the desorption unit 50 through the outlet 59 is condensed by a cooler or a condenser 81 and then separated by a separator or a decanter 82 into the organic solvent, the condensed water and the non-condensible gas, and finally, the organic solvent is recovered. In the present invention, since the non-condensible gas is utilized as the carrier gas, only an extremely small quantity of condensed water which comes from the water vapor (humidity) adsorbed by the activated carbon in the adsorption unit 40, is recovered by the separator 82.

Further, in a case where the thus separated non-condensible gas is not completely purified and still contains a small amount of the organic solvent, the separated gas may return to the adsorption unit 40 as shown by a dotted line R in FIG. 1.

In a preferred example of the operational conditions and the design matters of the present invention, the treating gas quantity supplied to the adsorption unit 40 is about 120–600m$^3$/hr, the linear velocity of the gas to be treated in the tank body is about 0.5 to 2.0m/sec, the desorption temperature in the desorption unit 40 is about 100°–180° C., a height of the adsorption unit 40 is about 2m, and that of the desorption unit 50 is about 2.2m. Thus, the recovering system 1 can be composed of respectively compact units or apparatus, which are to be easily movable by means of a vehicle, for example.

It will be desired that the organic solvents which can be treated by the recovering system of the present invention are halogen group solvents such as trichloroethylene, 1,1,1-trichloroethane, tetrachloroethylene, dichloroethylene, dichloromethane, trichlorotrifluoroethane, tetrachlorodifluoroethane, dibromotetrafluoroethane, trichloromonofluoromethane or the like. This is mainly based on the fact that an air can be utilized as the carrier gas when the incombustible halogen group solvents are recovered, resulting in cost reduction in the treatment. Further, it is to be noted that in a case where the desorbed solvent gas including halogen group organic solvent are not recovered, but they are burnt, an equipment for neutralizing and absorbing the incinerated gas including chlorine gas or fluorine gas by using chemicals is necessitated. In this meaning, the organic solvent recovering system 1 of the present invention, which includes a condensation process for the desorbed solvent gas, may be effectively utilized for a case where the soil is contaminated by a solvent contaminant including the halogen group solvent.

On the other hand, in a case where the soil contaminating substance is an inflammable organic solvent such as toluene, xylene, kerosine, gasoline or the like, the solvent recovering system of the present invention can recover the solvent as a condensate by using nitrogen gas or carbonic acid gas as a carrier gas. In such case, however, the condensed organic solvent is less useful, so that it will be desired to perform incineration treatment of the desorbed solvent gas together with the carrier gas. This recovering system of the present invention thus includes a system where the desorbed solvent gas is incinerated, but not condensed.

According to the present embodiment of this invention, a crude gas with solvent concentration of 500–3000ppm can be purified to 20–50ppm and then discharged.

However, in a case where the solvent concentration of the thus treated gas is more than the industrially regulated or approved concentration, for the environment, it is desired that an adsorption device provided with fixed bed packed with activated carbon will be further connected downstream side of the discharge port or the outlet port 48 to reduce the discharge gas concentration to several ppm. In such case, since the organic solvent of 90–99% in the crude gas to the adsorption unit can be removed by using the solvent recovering system of the present invention, the usable life time of the fixed bed adsorption device can be extremely elongated.

In the above modification, the gas treating apparatus of the present invention is connected in series to the fixed bed adsorption device, but as an alternative, they may be connected in parallel to each other. In such parallel arrangement, a change-over valve or the like may be disposed on the discharge side of the blower 16 to change over the crude gas flow to the gas treating apparatus or the fixed bed adsorption device. In general, the organic solvent concentration in the gas discharged from the vacuum pump P just immediately after the starting of the soil contamination cleaning operation, is extremely high such as of several thousand ppm. In such state, the solvent recovering working will be performed by changing the change-over valve to the gas treating apparatus of the present invention to recover the solvent, and after one or two months has elapsed at which the solvent concentration is reduced to about 100ppm, the change-over valve is changed to the fixed bed adsorption apparatus for the subsequent long term operation. That is, since the solvent concentration in the crude gas is not constant, it is desired to utilize the gas treating apparatus of the present invention at the initial stage of the soil contamination cleaning operation at which the solvent concentration is considerably high and to then utilize the fixed bed adsorption device at the subsequent stage at which the reduced solvent concentration is further gradually reduced in a long time operation period.

According to the structure of the organic solvent recovering system of the present invention described above, the gas containing organic solvent sucked from the contaminated soil is transferred into the gas treating apparatus through the vacuum sucking device. In the adsorption unit of the gas treating apparatus, the organic solvent contained in the gas is adsorbed by the activated carbon through the multistage fluidized bed thereof, and the activated carbon is then transferred into the desorption unit of the gas treating apparatus through a first transfer unit. In the desorption unit, the solvent containing gas desorbed and conveyed outside of the desorption unit by means of the carrier gas such as non-condensible gas preferably subjected to the separating operation, and the activated carbon particles with substantially no organic solvent is returned to the adsorption unit through the second transfer unit.

As described above, the treating apparatus comprises compact adsorption and desorption units each capable of easily being moved on a vehicle. The use of the non-condensible gas reduces the generation of the condensed water in the solvent recovery process.

What is claimed is:

1. A system for recovering an organic solvent contaminant in a soil, comprising:

means for sucking a gas containing the organic solvent contaminant from the soil contaminated by the organic solvent, comprising a solvent collecting tube inserted into the soil and a vacuum device connected to the solvent collecting tube for vacuum sucking the gas containing the organic solvent from the soil; and a gas treating apparatus connected to a discharge side of the vacuum device through a connection line for adsorbing and recovering the organic solvent in the gas, said gas treating apparatus comprising:

an adsorption unit connected to the vacuum device and provided with a multistage fluidized bed of activated carbon for adsorbing the organic solvent in the gas;

a desorption unit arranged side by side with the adsorption unit and provided with a moving bed of the activated carbon for desorbing the organic solvent from the activated carbon, said desorption unit being further provided with a heating means for heating the activated carbon of the moving bed and a gas supply means for supplying a carrier gas for carrying away a desorbed solvent gas out of the moving bed;

a first transfer means having one end connected to a bottom portion of the adsorption unit and another end connected to an upper portion of the desorption unit for transferring the activated carbon from the adsorption unit to the desorption unit; and a second transfer means having one end connected to a bottom portion of the desorption unit and another end connected to an upper portion of the adsorption unit for transferring the activated carbon from the desorption unit to the adsorption unit, wherein the activated carbon is circulated between said adsorption unit and said desorption unit through said first and second transfer means.

2. An organic solvent recovering system according to claim 1, wherein said first and second transfer means are pneumatic conveyer means.

3. An organic solvent recovering system according to claim 1, wherein said multistage fluidized bed comprises a plurality of perforated trays arranged nearly in parallel to each other so as to form the multistage fluidized bed of the activated carbon and each tray provided with a number of perforations.

4. An organic solvent recovering system according to claim 1, wherein said carrier gas is an air, a nitrogen gas or a carbonic acid gas.

5. An organic solvent recovering system according to claim 1, wherein said desorption unit is provided with a desorbed solvent gas discharge port, and said organic solvent recovering system further comprises a condenser and a separator which are connected to the desorbed solvent gas discharge port of said desorption unit for separating and/or recovering the organic solvent from the desorbed solvent gas.

6. An organic solvent recovering system according to claim 5, wherein said separator is operatively connected from an upper portion thereof to the connection line connecting the vacuum device and the gas treating apparatus.

7. An organic solvent recovering system according to claim 1, wherein said organic solvent is a halogen group organic solvent.

8. An organic solvent recovering system according to claim 1, wherein said organic solvent is a mixture containing a halogen group organic solvent.

9. An organic solvent recovering system according to claim 1, wherein said adsorption unit and said desorption unit each has a structure capable of being moved on a vehicle.

* * * * *